(12) United States Patent
Griepsma (10) Patent No.: US 8,136,799 B2
(45) Date of Patent: Mar. 20, 2012

(54) MULTIPLE DOWNCOMER TRAY

(75) Inventor: Bartele Griepsma, Metttendorf (CH)

(73) Assignee: Sulzer Chemtech AG, Winterthur (CH)

( * ) Notice: Subject to any disclaimer, the term of this patent is extended or adjusted under 35 U.S.C. 154(b) by 429 days.

(21) Appl. No.: 12/384,118

(22) Filed: Apr. 1, 2009

(65) Prior Publication Data

US 2009/0256270 A1 Oct. 15, 2009

(30) Foreign Application Priority Data

Apr. 11, 2008 (EP) .................................. 08154406

(51) Int. Cl.
*B01F 3/04* (2006.01)
(52) U.S. Cl. .................................................. 261/114.5
(58) Field of Classification Search ................ 261/114.1, 261/114.3, 114.5
See application file for complete search history.

(56) References Cited

U.S. PATENT DOCUMENTS

| | | | | | |
|---|---|---|---|---|---|
| 5,382,390 | A | * | 1/1995 | Resetarits et al. | 261/114.3 |
| 5,702,647 | A | * | 12/1997 | Lee et al. | 261/114.5 |
| 7,270,315 | B2 | * | 9/2007 | Burton et al. | 261/114.1 |
| 7,370,846 | B2 | * | 5/2008 | Xu et al. | 261/114.1 |
| 2001/0015504 | A1 | * | 8/2001 | Bosmans et al. | 261/114.1 |
| 2001/0030373 | A1 | * | 10/2001 | Bosmans et al. | 261/114.1 |
| 2004/0207103 | A1 | * | 10/2004 | Colic et al. | 261/114.1 |

* cited by examiner

*Primary Examiner* — Charles Bushey
(74) *Attorney, Agent, or Firm* — Francis C. Hand; Carella, Byrne, Cecchi (57) ABSTRACT

A multiple downcomer tray for a mass transfer column includes a mass transfer area and a plurality of downcomers for collecting and discharging a fluid from the tray. Each downcomer is shaped as a channel with an end wall attachable to an extension element. A downcomer and extension element together extends across the column and supports the panels of the mass transfer area.

17 Claims, 10 Drawing Sheets

Fig.1a

PRIOR ART

Fig.1b

PRIOR ART

Fig.1c

PRIOR ART

Fig.1d

PRIOR ART

Fig.1e

PRIOR ART

Fig.1f

PRIOR ART

MULTIPLE DOWNCOMER TRAY

This invention relates to multiple downcomer trays for mass transfer columns.

Downcomer trays have been in use for a considerable time in mass transfer columns. The known trays comprise mass transfer areas and fluid collecting and directing areas usually referred to as downcomers. In such a mass transfer column, a liquid and a gas pass in countercurrent flow over a series of trays. On the horizontal surface of the trays, the liquid and gas come into contact, which facilitates mass transfer between the respective liquid and gas phases present. Liquid thus flows downwardly from a first tray through first downcomers onto a second tray and usually across a mass transfer area. Such mass transfer areas are referred to as active tray areas in the literature. The mass transfer areas of such a tray allow for an intimate contact of a vapor-liquid mixture as the liquid passes across such a mass transfer area. Across these mass transfer areas, the vapor flows upwardly through apertures in the tray deck for interaction and mass transfer with the liquid. The liquid then discharges from the trays through downcomers.

A conventional arrangement of downcomers in a tray is a chordal arrangement. The downcomers of such a chordal arrangement traverse the cross-section of the tray along a chordal line, that is, a line dividing the cross-section of the tray into two sections. The longest chordal line of a tray is its diameter.

Multiple downcomer trays distinguish from chordal downcomer trays by the arrangement of the downcomers and typically also by the number of downcomers on the tray. Individual downcomers do not extend chordally from one side of the column to the other side. Their longitudinal extension, that is their length, in a direction parallel to the chordal length is thus smaller than the chordal length. Each of the downcomers is disposed with a width, the width being defined as the lateral extension normal to the chordal line and a height which is the extension normal to the plane containing the tray deck. They are characterized by a large outlet weir length, which is advantageous for high liquid rate operation. The outlet weir is defined as the weir that delimits the active area at its downstream end, where liquid leaves the tray deck and enters the downcomer.

The downcomers are usually truncated, i.e. downcomers of a first tray end at a level above the outlet weir which represents the upper ridge of the downcomers of the second, lower tray. Such truncated downcomers are usually closed by a seal plate at the bottom. The seal plate has an opening for liquid to pass onto the second tray arranged below. The size of the opening is chosen such that the dynamic resistance ensures a minimal liquid level in the downcomer.

The arrangement of the downcomers on trays having a chordal downcomer arrangement is such, that the active area is divided into a plurality of sub areas separated from each other by the downcomers. The sub areas represent flow passes. The arrangement of multiple downcomers on a multiple downcomer tray differs therefrom as the flow passages of each portion of the active area are connected such that a liquid element can in principle move to any portion of the active area of such a multiple downcomer tray. The active areas are therefore in hydraulic equilibrium with each other, hence a more robust design less prone to liquid maldistribution is provided.

A problem associated with the state of the art is concerned with the flatness of the tray. The weight of the trays in addition to the liquid load in operation applies a considerable force onto the tray, which the tray has to withstand. In particular, trays for columns with large column diameters need to support a considerable amount of liquid load as well as the weight of the tray itself.

For this reason, the multiple downcomer tray assembly as shown in U.S. Pat. No. 5,702,647 comprises support baffles extending along at least some of the downcomers for the support thereof. A plurality of mounting members secure the downcomers to the support baffles and at least two downcomers are disposed in spaced, end to end relationship within one of the trays facilitating an active tray bridge section disposed between the ends thereof. This construction permits an ascending vapor flow through the bridge, which increases the tray active area. The trays are further supported by a tower support ring extending circumferentially therearound.

In another embodiment of U.S. Pat. No. 5,702,647, the single continuous support baffle extends along the end to end, meaning until the tower support ring, to support the downcomers. In this respect, the tray of U.S. Pat. No. 5,702,647 resembles a conventional chordal downcomer tray. An intermediate region of the single continuous support baffle is open for receiving the bridge section there through and facilitating liquid flow there across for equalization of liquid flow on the tray. This bridge section interconnects the liquid passages and thus qualifies the downcomer tray of U.S. Pat. No. 5,702,647 as a multiple downcomer tray. From the above description it implicitly results that the liquid distribution on such a tray may not be uniform which may result from deflections of the support baffle under the load of the tray and the downcomers as well as under the load of the liquid distributed on the upper surface of the tray.

A further problem, which may be associated with the proposed bridge section, is that this bridge section actually contributes in weakening the support construction. In all embodiments showing such a bridge section, it is positioned in a central portion of the tray, thus in the zone subjected to the highest tensile stresses due to deflection. Therefore, the proposed solution appears to be unsuitable in further providing support for the tray so as to limit deflection thereof.

As an alternative solution for a multiple downcomer tray, support beams have been provided to support the panels making up a tray and to ensure a horizontal orientation and the flatness thereof. Such support beams are shown for example in GB1422131 and they are needed in particular for large trays for columns with diameters from 3 m upwards. At least one of the support beams traverses the tray, thereby in general reducing the mass transfer area. Therefore a portion of the tray in addition to the area reserved for the downcomers is not usable for mass transfer. As a consequence, the capacity of the tray will decrease. The capacity of the tray can be defined as the point of maximum through-put through the column. The through-put is limited by the maximum allowable gas velocity at a given liquid loading. As the gas is obliged to pass the mass transfer area and the liquid on the tray, the velocity will increase considerably if the available free area for gas passage is decreased. Higher velocity causes increased entrainment, referring to a flow regime in which liquid droplets are carried off upwards by and with the gas stream resulting in a first instance in a froth of lower density and increased height but in a second instance leading to channeling effects, maldistribution and reduced mass transfer efficiency. In operation, the column will eventually fill with liquid as the liquid carried upwards by entrainment accumulates in the column and is therefore prevented from flowing downwardly and being eventually discharged.

Theoretically, the mass transfer regime hence changes to result in a final stage in a regime resembling that of a bubble column. Under this scenario, bubbles of gas are ascending through the liquid having filled up the column. The available gas-liquid interface available for mass transfer under such a regime decreases drastically. Due to the high pressure drop, the high liquid holdup and the low mass transfer, this regime is never approached in distillation practice.

As shown in all earlier examples, a large column diameter, e.g. above three meters, requires support beams for the trays, as the tray would deflect due to its own weight and as a consequence of the liquid load resulting from the liquid phase covering the tray in operation. Therefore, the deflection of the tray is usually limited in tray specifications for tray manufacturers. According to standard specifications, the deflection of tray assemblies under operating loads shall be limited to typically 1/800 of the internal column diameter. Tray assemblies shall be capable of supporting their own weight plus a concentrated load of typically 1000 N located at any trusses on the tray at ambient temperature. The maximum stress permitted under this condition is typically 67% of the yield stress at ambient temperature.

Such support beams as proposed in GB1422131 are also the preferred solution in conjunction with conventional chordal downcomer designs. The chordal downcomers, in particular when used in combination with a large column diameter, are supported by support beams. However, GB1422131 deals with a special multiple downcomer arrangement of downcomers that has been found useful to achieve high capacity. Differently to the conventional chordal downcomer trays, the downcomers according to GB1422131 do not extend from one side of the tray to the other side. They end shortly before the center line of the tray, hence forming three rows of downcomers. Designs with two or more than three such rows are possible. Downcomers of adjacent rows of the same tray are arranged in a staggered manner. Such downcomers can be supported by the support ring on one side, on the other side that is at the center line in the case of a two row design, a support beam is mandatory. Such a conventional support beam extends from end to end along a chordal length perpendicular to the downcomer orientation of the tray and is attached to the annular ring and/or the column wall. The downcomers are attached laterally, that is along their width, to the support beam or the annular ring. In particular for columns with diameters greater than 3 m, a row of downcomers consists of a plurality of downcomers followed by a plurality of portions of the mass transfer area. For columns of small diameter, a row consists of at least one downcomer bordered by portions of mass transfer area. When looking into the direction of a row, a downcomer is followed by a portion of mass transfer area. When looking into a direction normal to each row, a downcomer is also followed by a portion of the mass transfer area, except for downcomers next to the column wall. Thus, the downcomers of neighbouring rows are arranged in a staggered manner.

In order to comply with the flatness requirements for the tray, such a staggered arrangement of downcomers of each adjacent row has until now been possible only under the condition that the lateral sides of the downcomers are attached to a support beam as shown in GB1422131.

A main focus in tray design has always been to make use of sheet metal as economically as possible to keep material costs down and weight of the column internals as low as possible. This has been the reason for the use of a support beam which has so far been considered as the best practice.

It is an object of the invention to provide a multiple downcomer high capacity tray with an increased mass transfer area.

It is a further object of the invention to provide a support structure of reduced weight in particular for a large diameter column.

Briefly, the invention provides a multiple downcomer high capacity tray in which the downcomers are part of a support structure for keeping the deflection of the tray surface within acceptable limits.

The multiple downcomer tray for a mass transfer column comprises a mass transfer area and a plurality of downcomers for collecting and discharging fluid from the tray, each of the downcomers being shaped as a channel for fluid flow. Each channel is delimited by a pair of lateral sidewalls and an end wall connecting the lateral side walls, such that the end wall of each downcomer is attached to an extension element. The downcomer and extension element together extend from a first column wall support means to a second column wall support means.

In use, a fluid comprising a heavier liquid descends the column and a gas or a lighter liquid ascends the column. As a further advantage, a separate support beam may be eliminated.

Preferably, a first downcomer of the plurality of downcomers is arranged in parallel orientation to a second downcomer of the plurality of downcomers, in particular with at least 4 downcomers arranged on the tray. Advantageously, the extension element is configured as a part of the mass transfer area, so as to increase the portion of mass transfer area of the tray surface.

In a preferred embodiment, the extension element consists of a panel body and at least one leg attached to the panel body in a depending manner. The panel body may be elevated with respect to the mass transfer area or recessed relative to the mass transfer area, for easy connection of the panels of the mass transfer area to the extension element.

The leg extends in an essentially downward direction with respect to the mass transfer area and a foot is arranged at an angle with respect to the leg for increased stability.

In an advantageous embodiment, the panel body may comprise at least one buckle and at least one inclined surface extending from the buckle to the leg, such that the liquid flow is divided more rapidly and evenly onto the mass transfer area adjacent to the extension element.

The embodiments of the invention are particularly advantageous, if the diameter of the tray is at least 3 meters.

The plurality of downcomers is arranged in a plurality of rows, such that in each row, the lateral side walls of adjacent downcomers face each other and the downcomers of neighbouring rows are arranged in a staggered manner.

A manway is provided in the mass transfer area for allowing access for inspection or maintenance to the tray below. Advantageously, downcomers are provided with removable anti-jump baffles to allow a human to move between adjacent sub areas of the tray. These anti-jump baffles are usually provided to direct and guide the liquid flow from each lateral side into the downcomer and to avoid splashes which may increase entrainment by the ascending gas flow.

The downcomer and/or the extension element can be pre-stressed. Alternatively or in addition thereto, the downcomer and/or extension element can include reinforcing means. At least one of the downcomers may be a truncated downcomer. The mass transfer areas are interconnected, which allows for a balancing of fluid flow on the tray.

The trays are particularly advantageous for arrangements in a heat and mass transfer column.

Unexpectedly, a solution requiring more material for the mass transfer panels and extension elements results in a more economical solution. Even if more material is consumed for the construction of the mass transfer panels and the extension elements, this is compensated by the absence of a separate support beam or by a reduced number of support beams in case of columns with large diameters.

These and other objects of the invention will become more apparent from the following detailed description taken in conjunction with the accompanying drawings wherein:

FIG. 2a illustrates a perspective view of a tray according to a first embodiment of this invention;

FIG. 2b illustrates a sectional side view of the tray of FIG. 2a according to section B-B of FIG. 2a;

FIG. 3a shows a first embodiment of an extension element according to section C-C of FIG. 2a;

FIG. 3b shows a view from above onto the embodiment of FIG. 3a;

FIG. 4a shows a second embodiment of an extension element according to section C-C of FIG. 2a;

FIG. 4b is a lateral view on the embodiment of FIG. 4a;

FIG. 6a shows a fourth embodiment of an extension element according to section C-C of FIG. 2a;

FIG. 6b shows a lateral view of the embodiment according to FIG. 6a;

FIG. 7a shows a fifth embodiment of an extension element according to section C-C of FIG. 2a;

FIG. 7b shows a variant of the fifth embodiment of FIG. 7a;

FIG. 8a shows a sixth embodiment of an extension element according to section C-C of FIG. 2a;

FIG. 8b shows a lateral view of the embodiment according to FIG. 8a;

Figure 1A:
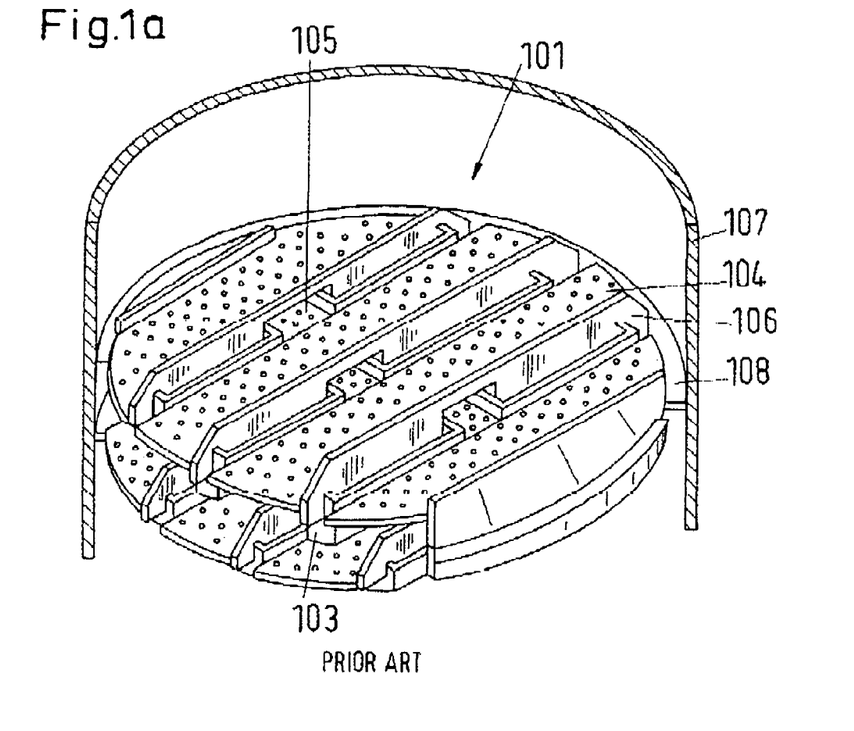
FIG. 1a shows a prior art solution for a multiple downcomer tray with support baffles.

FIG. 1a shows a multiple downcomer tray 101 according to a first embodiment of the prior art. The multiple downcomer tray 101 is provided with a plurality of downcomers 103 arranged on a chordal length of the tray. The downcomers 103 are arranged parallel to each other. First downcomers are arranged on a first chordal length. These first downcomers are separated from neighbouring, second downcomers arranged on a second chordal length parallel to the first chordal length by panels 104. The panels 104 constitute the mass transfer area of the tray, the so called active area. The liquid on the tray surface is intimately contacted with a vapour ascending through openings provided in the panel 104. Each downcomer 103 on a respective chordal length may be subdivided into two portions by an intermediate bridge section 105 and is disposed with a support baffle 106 extending end to end to the column wall 107. An annular support ring 108 is attached to the column wall for providing support for the support baffle.

Figure 1B:
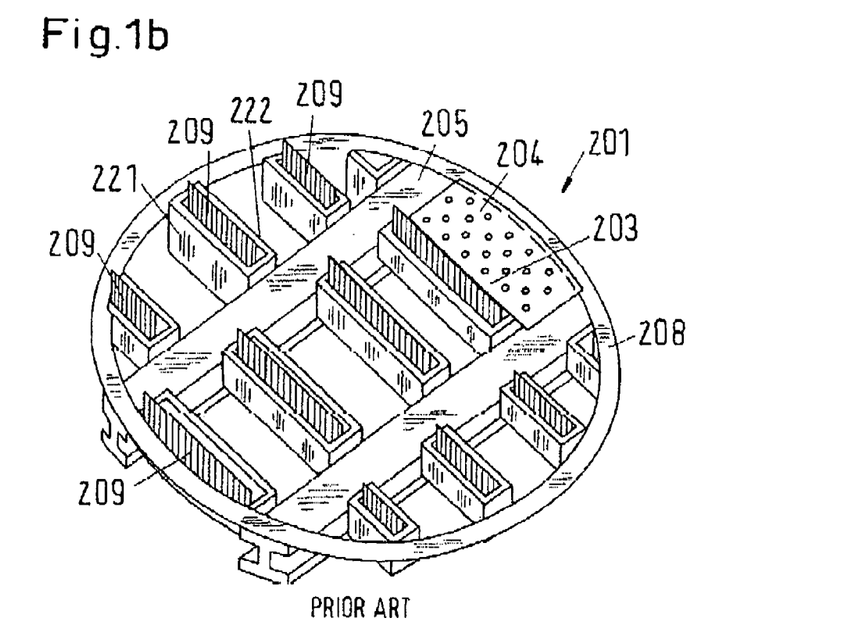
FIG. 1b shows a further example of a multiple downcomer tray according to the prior art.

FIG. 1b shows a multiple downcomer tray 201 according to a second embodiment according to the prior art showing multiple rows of downcomers 203. The downcomers 203 of this embodiment are supported by one or more beams 205 traversing the column. The downcomers 203 are supported by these support beams and by an annular ring 208 attached to the column wall. Downcomers of neighbouring rows are arranged in a staggered manner. Each downcomer in a row is followed by a portion of mass transfer area. The mass transfer area 204 is formed by panels arranged in the free space between the downcomers 203 or between downcomers and the annular ring 208. The panels are supported by the beam 205 and possibly also by support means (not shown) provided on the lateral sides (221, 222) of the downcomers 203 and by the annular ring 208. Each of the downcomers receiving liquid from a first lateral side 221 and a second lateral side 222 contains an anti-jump baffle 209. This anti-jump baffle 209 separates the incoming liquid streams from the first and second lateral sides and helps to direct the liquid to the tray beneath.

Figure 1C:
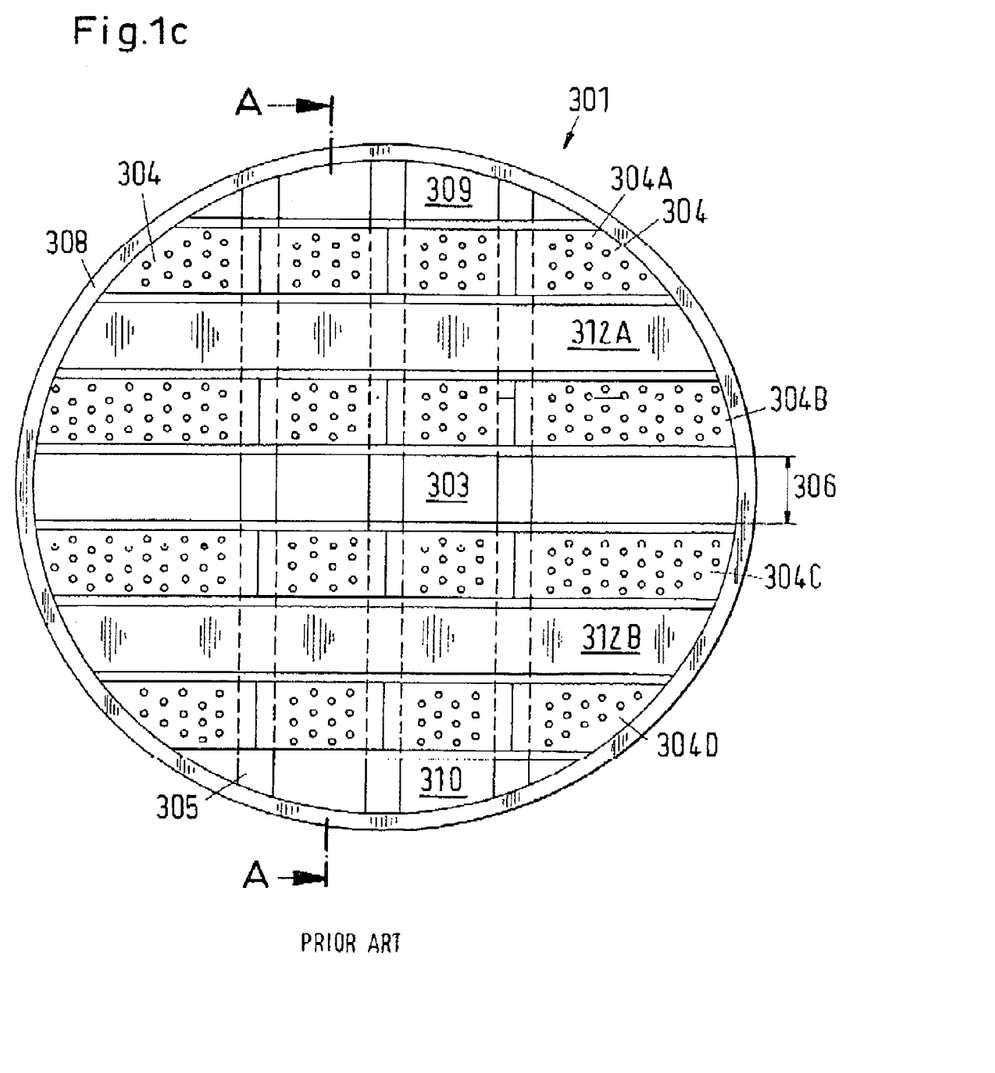
FIG. 1c shows a top view of a conventional tray with chordal downcomers according to the prior art.

FIG. 1c shows a conventional chordal downcomer tray 301, e.g. a four pass tray. The downcomers 303,309,310 of such a chordal arrangement traverse the cross-section of the tray along a chordal line, that is a line dividing the cross-section of the tray into two sections. They are supported by a plurality of beams 305 arranged on chordal lines which are arranged orthogonally to the chordal lines of the downcomers 303,309,310. The longest chordal line of a tray is its diameter. In FIG. 1c three such downcomers are shown. Each downcomer extends along a chordal line to an annular ring 308 for supporting the downcomer within the column. The annular ring 308 is attached to the column wall (not shown). Each of the downcomers is disposed with a width 306, that is the lateral extension normal to the chordal line and a height 311, which is defined as the extension normal to the plane containing the tray as shown in each of FIG. 1d, 1e, 1f, which are sections along line A-A of FIG. 1c.

The arrangement of the downcomers on trays having a chordal downcomer arrangement is such, that the mass transfer area 304 is divided into a plurality of sub areas (304A, 304B, 304C, 304D) separated from each other by the downcomers or an inlet area (312A, 312B), which is the area below the downcomer of the upper tray, which is partially shown in FIG. 1d. The sub areas (304A, 304B) and the inlet area (312A) represent a flow passage. The sub areas (304C, 304D) and the inlet area (312B) represent another flow passage. However in a chordal downcomer tray, as shown in FIG. 1c, a liquid element is moveable only between outlet weirs (313A, 313B, 314A, 314B), of the downcomers bordering the respective flow passage.

Figure 1D:
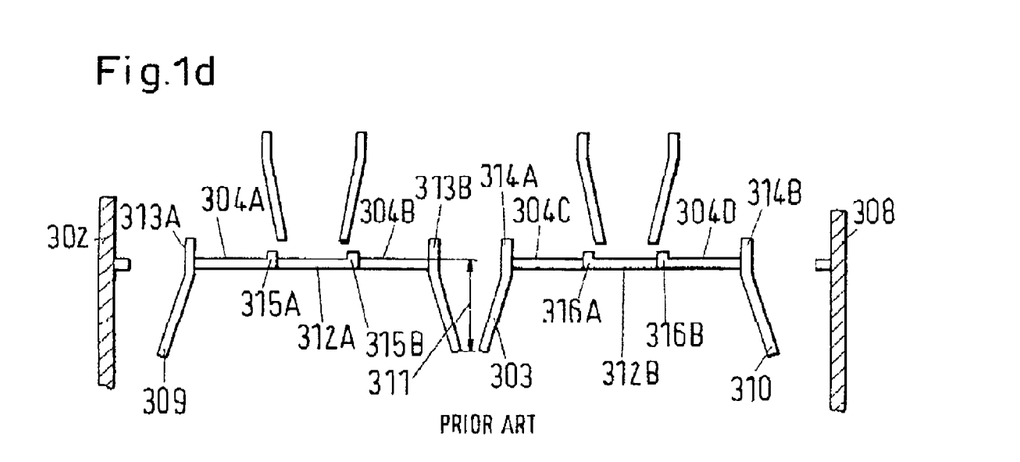
FIG. 1d-FIG. 1f show sectional side views of the tray according to section A-A of FIG. 1c.
Figure 1E:
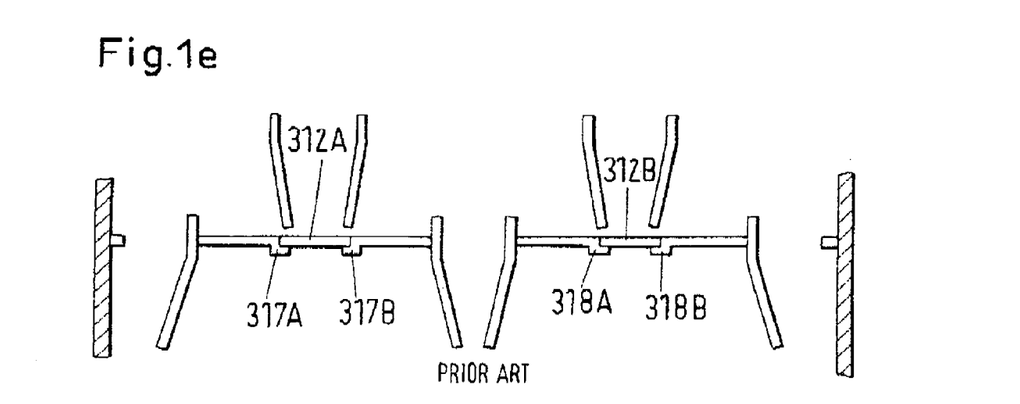
Figure 1F:
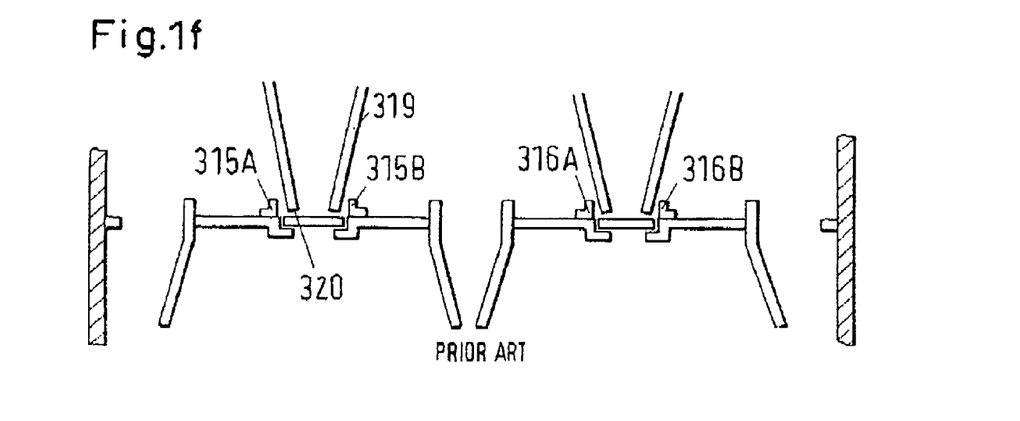

In any of the embodiments according to FIG. 1c, 1d, 1e, if any cross-flow to any other flow passage is not possible. Therefore, such a chordal downcomer design is not suitable if it is desired, that at least a portion of the liquid present on the tray in operation is foreseen to be exchanged between different flow passages, thereby contributing to more uniform mass transfer conditions across the entire tray surface. FIG. 1e and FIG. 1f show different details of the inlet areas (312A, 312B). The inlet area 312A of FIG. 1d is bordered by a first and second lateral inlet weir (315A, 315B), the inlet area 312B is bordered by a first and second lateral weir (316A, 316B). FIG. 1e shows an embodiment, for which there are no weirs foreseen, which border the inlet areas (312A, 312B). Each of the inlet areas (312A, 312B) is formed of a panel, which is supported by a supporting element (317A, 317B, 318A, 318B). FIG. 1f shows a similar construction as FIG. 1e with regard to the inlet areas, however first and second lateral inlet weirs (315A, 315B, 316A, 316B) are also provided. The lateral weirs may be removably attached depending on the characteristics of fluid flow. The discharge opening of the downcomer 319 from the uppermost tray may end at a lower level than the height of the lateral weirs (315A, 315B, 316A, 316B), such that a liquid seal is provided. Under liquid seal it is intended, that the whole inlet area (312A, 312B) is covered with liquid up the weir height and the side wall of the downcomer from the uppermost tray extends into the liquid. Thereby, it is avoided that ascending gas enters into the downcomer through its discharge opening 320 as the discharge opening 320 is immersed in liquid, when in operation. This embodiment according to FIG. 1f is particularly advantageous in providing a good separation between the gas and liquid phases in the downcomer 319.

The arrangement of multiple downcomers on a multiple downcomer tray according to the embodiments described below differs therefrom as the flow passages of each portion of the mass transfer area are connected such that a liquid element can in principle move to any portion of the mass transfer area of such a multiple downcomer tray.

Figures 2A, 2B:
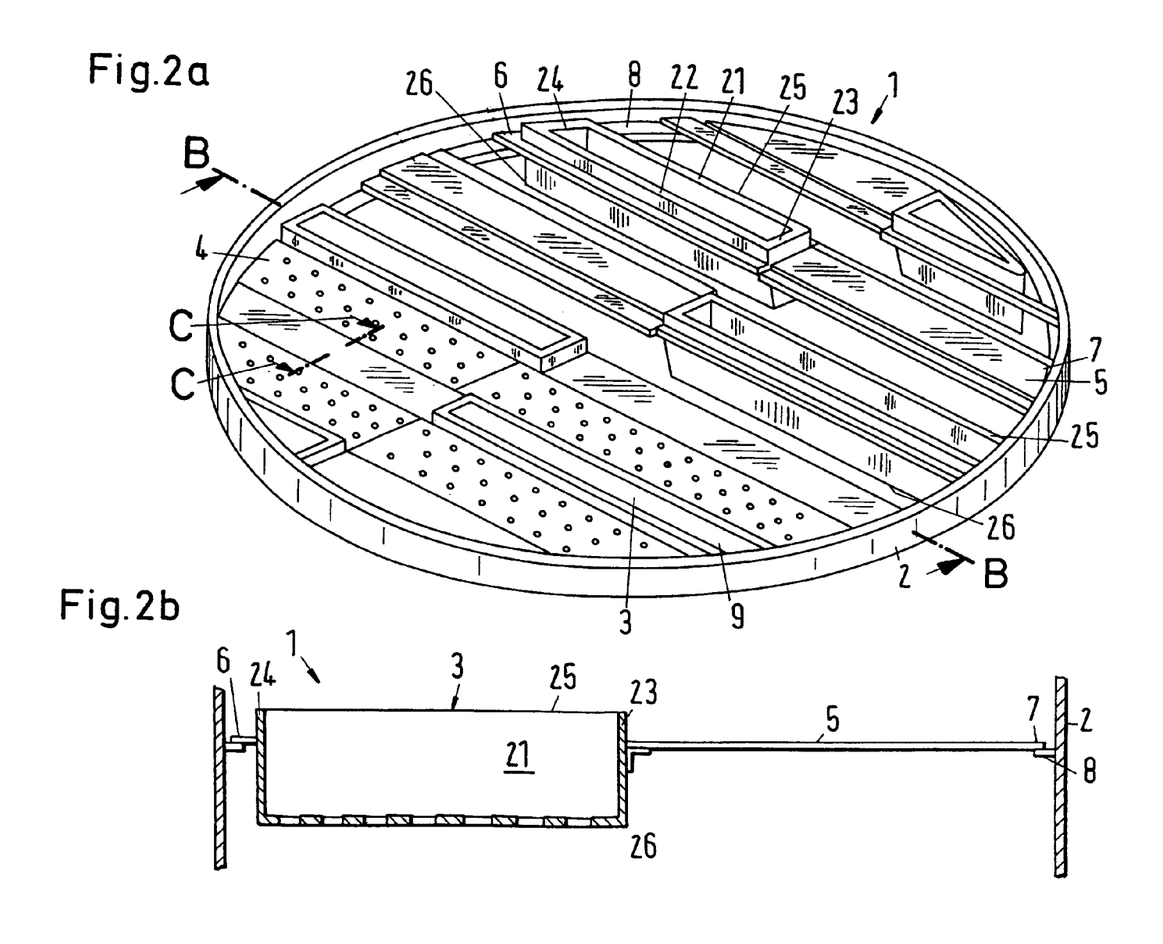

FIG. 2a shows a view on a multiple downcomer tray 1 according to the invention arranged within a column 2, such as a mass transfer column, of which only an annular section is shown. The tray 1 comprises a mass transfer area 4, which is only partially shown in this drawing, and a plurality of downcomers 3 that collect and discharge fluid from the tray 1, thus operating as fluid discharge means.

Each of the downcomers 3 is shaped as a channel 9 delimited by a pair of lateral sidewalls 21, 22, a front end wall 23 and/or a rear end wall 24 connecting the lateral side walls (see FIG. 2b). The upper edges of the side walls, front end wall and/or rear end wall form an upper ridge 25 and the lower edges of the side walls, front and/or rear end wall form a lower ridge 26. The upper ridge 25 (which may be considered as an outlet weir) delimits an opening for fluid to enter the channel 9 and the lower ridge 26 delimits an opening for the fluid to exit the channel 9, or provides an attachment means for a downcomer floor with openings, as shown in FIG. 2b, for the fluid to exit the channel 9.

An anti-jump baffle (not shown) may be provided similar to the arrangement shown in FIG. 1b.

At least one of the front and rear end walls 23, 24 of each downcomer 3 is attachable to an extension element 5 that extends longitudinally from the downcomer 3. A downcomer 3 and an extension element 5 together extend from a first column wall support means 6 to a second column wall support means 7. The column wall support means 6 and the column wall support means 7 may be part of the extension element 5 or attached to an end wall 24 of the downcomer 3.

Referring to FIGS. 2a and 2b, an annular ring 8 is fixed to the inside of the wall of the column 2 and each downcomer 3 has a peripheral flange (wall support means) 6 on the rear end wall 24 that sits on the annular ring 8. The peripheral flange 6 also extends along each side wall 21,22 to receive the plates of the mass transfer area 4. The extension element 5 has an end (wall support means) i that sits on the annular ring 8 and an opposite end that is secured by an angle-shaped attachment means to the front wall 23 of a downcomer 3. As shown in FIG. 2b, a downcomer 3 and an extension 5 form a structural unit similar to a structural beam that extends chordally across the column 2 to rest at the ends on the annular ring 8 and serves as a unitary support structure for the panels of the mass transfer area 4.

The downcomer 3 and the extension element 5 together thus perform the function of a reinforcing profile. Additionally, a beam may be provided in combination with the reinforcing profile constituted of the extension element 5 and the downcomer 3 for further reinforcement in particular when the combination of downcomer 3 and extension element 5 as outlined above is used in a column with a large diameter. For such columns—referring in general to column diameters of three meters and above—a plurality of rows of downcomers 3 can be foreseen.

Figure 2C:
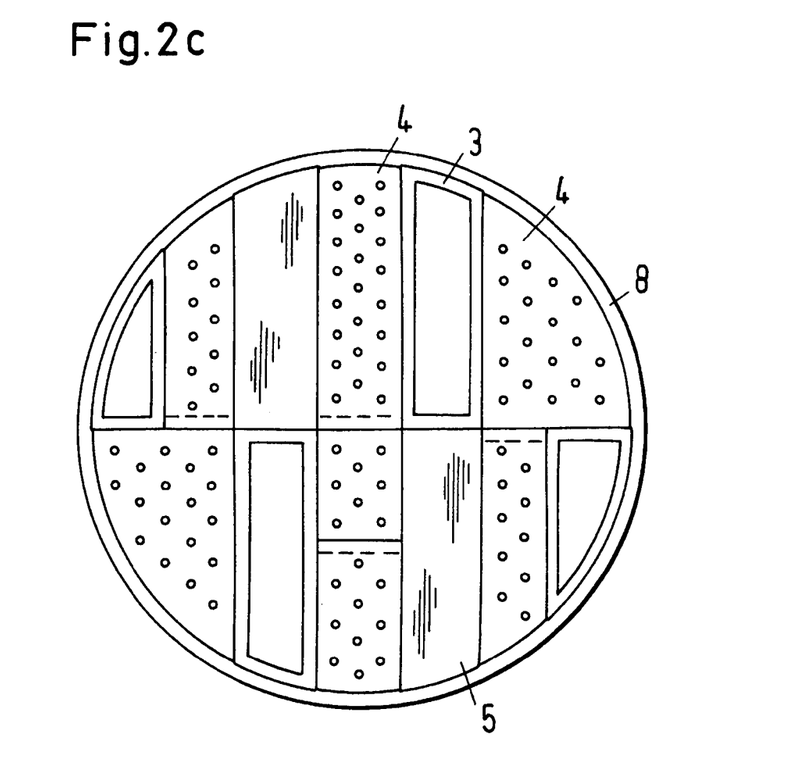
FIG. 2c illustrates a tray according to a second embodiment of this invention in a view from above.

FIG. 2c shows two rows of downcomers 3. In each row, downcomers 3 and extension elements 5 follow in alternating sequence. In FIG. 2c, a first and second row of downcomers is shown in the horizontal direction. Downcomers of adjacent rows are positioned in a staggered arrangement as each row features an alternating sequence of downcomer and extension element. Any space which is not covered by downcomers or extension elements is part of the mass transfer area 4.

Figure 2D:
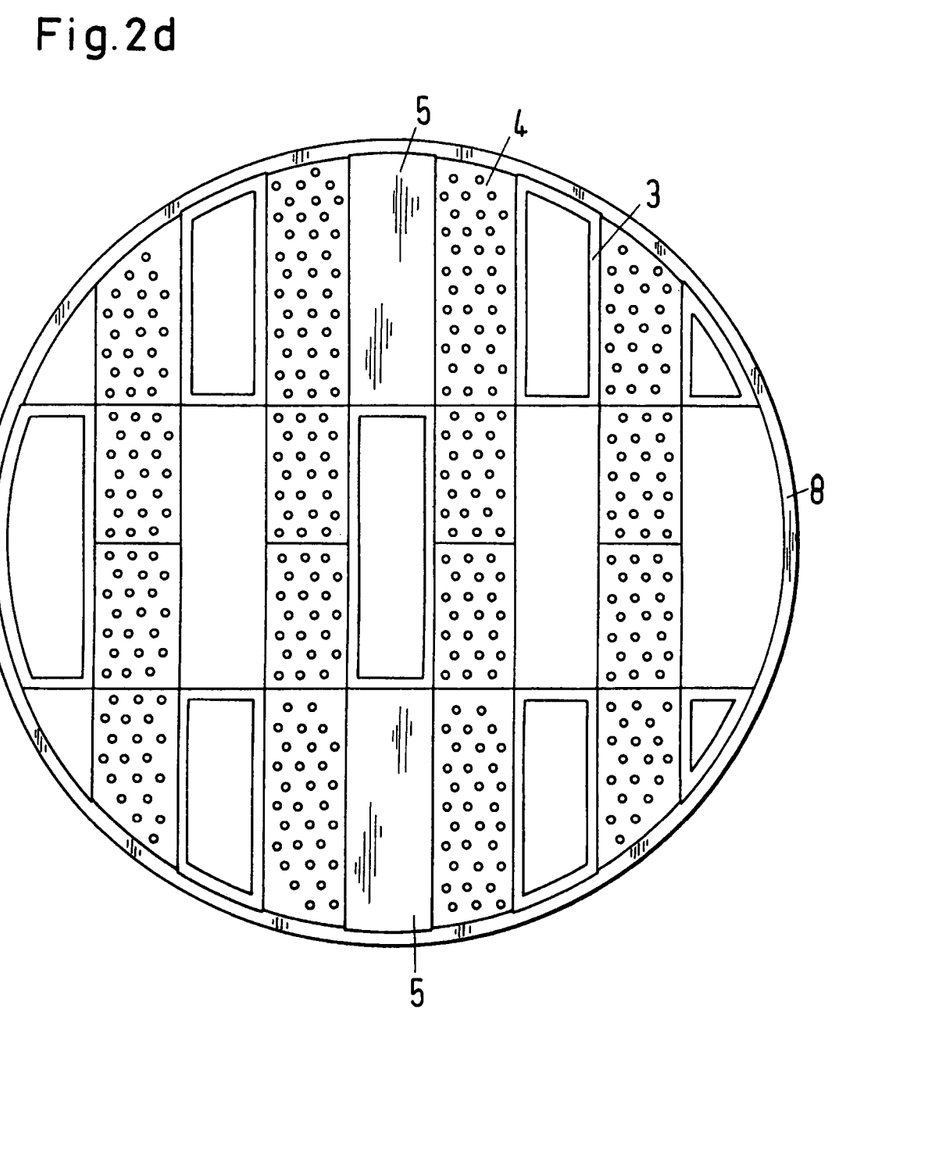
FIG. 2d illustrates a tray according to a third embodiment of this invention in a view from above.

A tray having downcomers arranged in a staggered arrangement as shown in FIG. 2c or 2d collects the liquid on the tray uniformly and collects it for transporting it to a tray arranged below thereof. For obtaining uniform liquid distribution on the tray below, the downcomers are preferably arranged parallel to each other. Each downcomer thus receives roughly the same amount of liquid as the average distance the liquid has to travel over the tray surface is roughly the same so as to allow for uniform distribution of liquid on the tray surface and for uniform discharge to the tray below. All mass transfer areas 4 are interconnected, which allows for a balancing of fluid flow on the tray. Thereby, a robust design is achieved and the tray is less prone to maldistribution effects compared to a chordal downcomer design.

FIG. 2d shows an arrangement having three rows of downcomers 3. In this embodiment, it is further shown, that a downcomer 3 may be attached to two extension elements 5 as shown for the central row. The mass transfer area 4 is in its simplest form a panel or a combination of panels containing perforations arranged in the free area between the downcomer and the extension element. Furthermore, as shown, the panels of the mass transfer area 4 either extend over the entire width of a row or are further subdivided for the central row.

In FIG. 2a, a part of the mass transfer area is not shown to allow the support structure for the panels and the support structures of the downcomers 3 and extension elements 5 to be more visible. The length and number of the downcomers may vary according to the required through-put of liquid. Any space of the reinforcing profile which is not needed for the downcomer may be covered by the extension element. The extension element may be provided with openings to allow gas to pass, thus contributing to the mass transfer area.

The panels of the mass transfer area 4 are removably attached to the support structures. The panels of the central row can therefore easily be lifted for accessing a tray arranged below. By lifting the panels of the central row and placing them on top of the panels of the uppermost or lowermost row (position as shown in the drawing) or by pivoting the panels about an axis or by folding them away, a manway (passageway for a person) is provided. Such an arrangement is particularly advantageous for larger column diameters. The number and arrangement of manways not only contributes to the construction costs, but also to the operational and service costs. Therefore, the number of manways is to be kept minimal. The use of a multiple downcomer tray according to any of FIG. 2a to 2d makes it possible to reduce the number of manways. Only a single manway per row of downcomers is required.

If the downcomers are equipped with anti-jump baffles, these anti-jump baffles are preferably movably or removably attached to the downcomers. A further advantage of the invention is thus revealed. The prior art as shown by example in FIGS. 1a and 1b contains support structures, that is support baffles in FIG. 1a and beams in FIG. 1b, which may limit access to the tray only to a section thereof. That means, that for the embodiment according to FIG. 1a, a multitude of manways has to be provided as only the portion between two adjacent baffles may be accessible, which adds a certain complexity to the construction according to FIG. 1a.

According to the invention, a passage is provided below the extension elements, so that by providing a single manway in the upper tray, the tray arranged below thereof is accessible over its entire surface. The passage below the extension elements is possible due to the fact that the extension element has only a small height. Therefore, the distance between the extension element and the adjacent tray arranged below allows for access for servicing or cleaning the trays.

A further advantage of the invention is, that the construction can easily be modified, if a downcomer of different length is to be used following a change during operation of the column, e.g. a change of the ratio of gas to liquid or the temperature profile or the like. The only modification required in such a case is to cut the extension element to the appropriate length or substitute the extension element by an extension element of greater length in addition to replacement of the downcomer. Consequently, the reinforcing profile according to the invention increases flexibility of the tray in use.

The common axis of a downcomer 3 and an extension element 5 is a chordal length of the column cross-section. All axes defined in the same way as above are parallel to each other in a tray arrangement as shown in FIG. 2a-d. The axes formed by the chordal lengths of a neighbouring tray are also parallel to each other as for example shown in FIG. 1a, however they are not necessarily arranged directly beneath the corresponding axis of the upper tray but staggered with respect to said axis. This staggered arrangement has the advantage, that the liquid discharged from the upper downcomer 3 arrives on a mass transfer area 4 and does not pass directly into the downcomer 3 below, which would result in a channeling of the liquid and gas flows thereby greatly reducing the contact between ascending gas and descending liquid phase and thereby reducing the mass transfer to a suboptimal amount. Instead of this staggered arrangement, the axes formed by the chordal lengths, downcomer and extension element combinations of neighbouring trays may be arranged at an angle to each other, in particular in crosswise arrangement (not shown in the Figures).

Figure 3A:
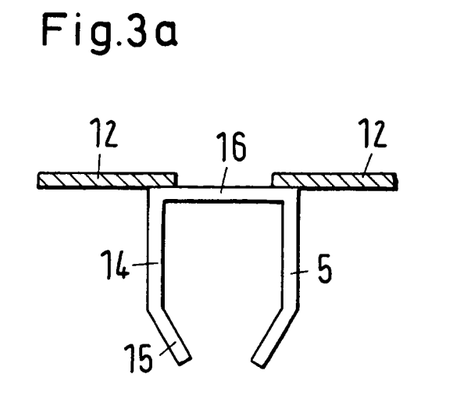
Figure 3B:
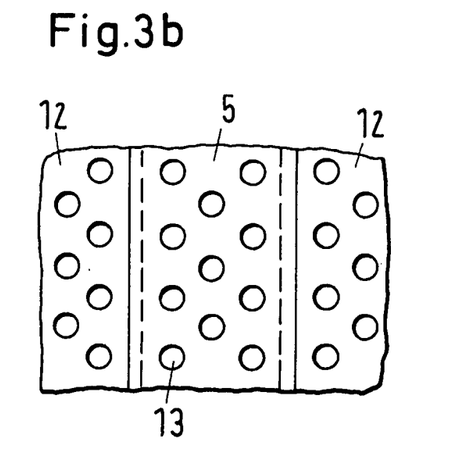

FIG. 3a and FIG. 3b show a first embodiment of an extension element 5 according to section C-C of FIG. 2a. FIG. 3a shows a portion of the mass transfer area, such as a perforated panel 12. FIG. 3b shows a view from above onto a portion of the extension element 5 as well as the perforated panel 12. The extension element 5 is preferably shaped as an open profile, which provides optimum stability with minimal material required for its manufacture. The extension element 5 may also contain perforations 13 in the panel body 16. Hereby, a further advantage of the invention is revealed. The extension element 5 may be used almost in its entirety as a mass transfer area, whereby the ascending gas phase passes through the perforations 13. Such a tray has increased capacity, as the whole cross-sectional area of the column minus the area covered by the downcomers 3 and the area covered by the column wall attachment means 6,7 is usable as mass transfer area. The extension element 5 in this embodiment is constituted of the planar panel body 16 and a pair of depending lateral legs 14 which may terminate in feet 15 which can be inclined with respect to the legs 14 to provide further stability to the extension element.

Figure 3C:
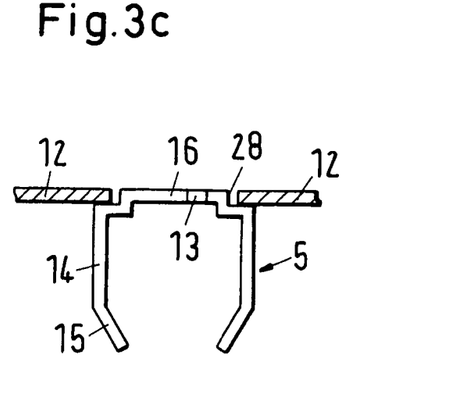
FIG. 3c shows a variant of the first embodiment of an extension element according to the invention.

FIG. 3c shows a variant of the embodiment presented in FIG. 3a and 3b. In this variant, the panel body 16 has lateral indentations 28 for receiving perforated panels 12. This embodiment is advantageous as the liquid level above the perforated panels 12 and the panel body 16 of the extension element 5 is the same. Thus, the conditions for mass transfer above the perforated panels 12 and the panel body 16 are roughly the same or comparable.

Figure 3D:
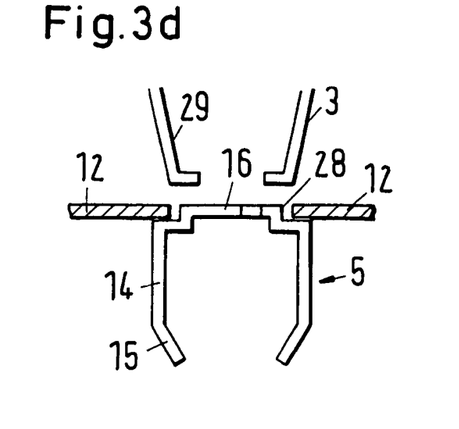
FIG. 3d shows the variant of FIG. 3c with a truncated downcomer.

FIG. 3d shows the variant of FIG. 3c including a truncated downcomer 29. In this case, the panel body 16 is essentially free of perforations in order to avoid weeping effects. However, truncated downcomers can be combined with perforations on the inlet area below, thereby increasing the active area. As opposed to the truncated downcomer, the non-truncated or conventional downcomers extend down to a level which is below the upper ridge of the outlet weir. As a consequence, the froth level is usually higher than the discharge opening of the downcomer, such that the discharge opening extends into the liquid. Thereby, a liquid seal is provided impeding any gas flow upwards through the downcomer 3 as well as ensuring that the downcomer discharge opening will not run dry at any time. Therefore, the dimensioning of the discharge opening influences the liquid backup in the downcomer and consequently the capacity of the tray.

Figure 4A:
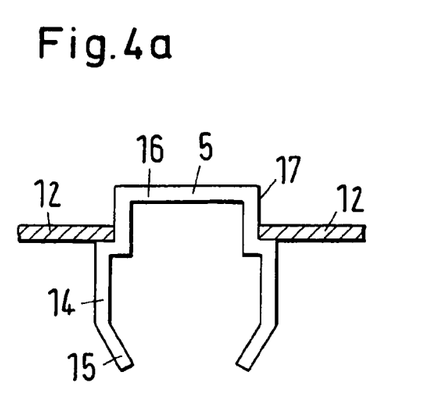
Figure 4B:
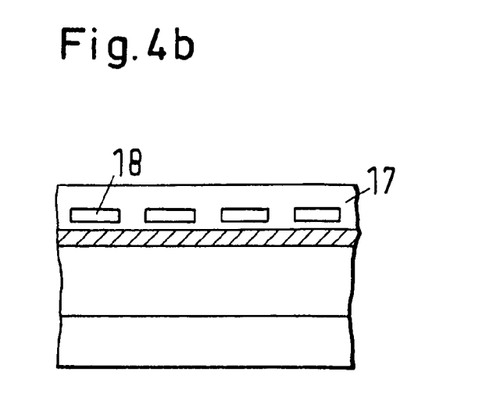

FIG. 4a and FIG. 4b show a second embodiment of an extension element 5 according to section C-C of FIG. 2a. The second embodiment differs from the previously described embodiment only in that it is mounted in an elevated position relative to the surface of the perforated panel 12. The panel body 16 as well as a portion 17 of leg 14 extend above the level of the perforated panel 12. The portion 17 of the leg 14 may contain openings 18 for allowing gas or a liquid of lower density than the liquid on the perforated panel 12 to pass therethrough. Such a flow in a tangential direction to the perforated panel 12 may assist the liquid on the perforated panel 12 to proceed in the direction of the nearest downcomer 4 (see FIG. 2a-2d).

Multiple downcomer trays, such as those of the embodiments according to FIG. 4a or FIG. 4b usually use truncated downcomers. The lower end of such a truncated downcomer is provided with a seal plate and is placed at a level above the top level of outlet weirs mounted on top of adjacent downcomers of the tray below.

Figure 5:
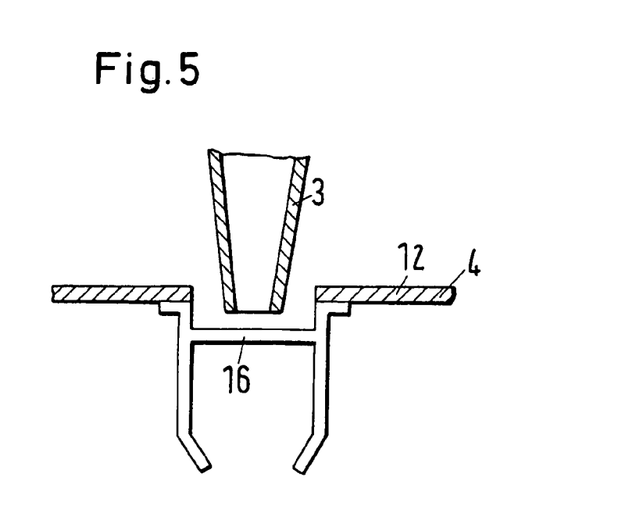
FIG. 5 shows a combination of a downcomer with an extension element according to a third embodiment.

FIG. 5 shows a third embodiment of an extension element according to section C-C of FIG. 2a. In this embodiment which is usually combined with non-truncated downcomers, the level of the panel body 16 is lower than the level of the perforated panels 12 of the active area. Such an arrangement may be used to increase the downcomer volume by increasing the height of the downcomer. Increasing the height generally improves separation of the gas and liquid phases as the residence time in the downcomer increases. Furthermore, panel body 16 may have a slope towards the downcomer as to assist the flow of liquid towards the tray below.

Figure 6A:
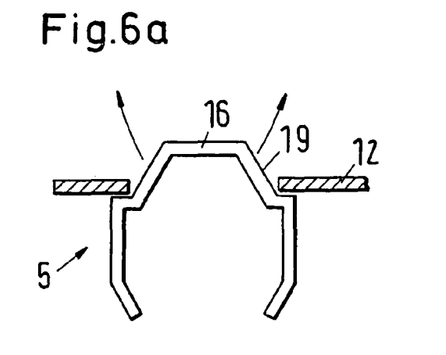
Figure 6B:
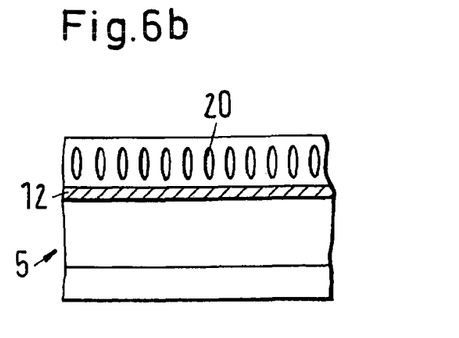

FIG. 6a and FIG. 6b show a fourth embodiment of an extension element according to section C-C of FIG. 2a. This embodiment differs from FIG. 4a only in that the panel body 16 comprises at least one buckle 19. The surface of the panel body 16 extending from the buckle 19 to the level of the perforated panel 12 is inclined and may contain openings 20 as shown in FIG. 6b. This embodiment is particularly useful as a froth promoter.

Figure 7A:
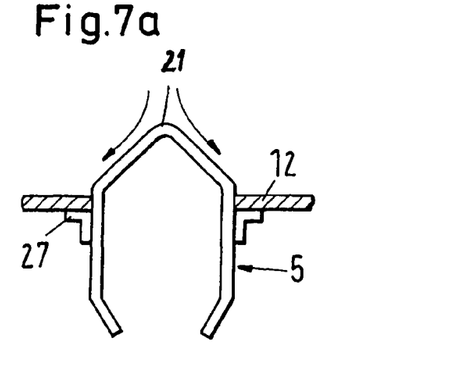
Figure 7B:
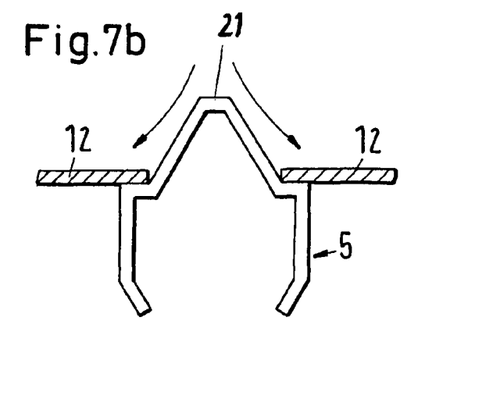

FIG. 7a and FIG. 7b show a fifth embodiment of an extension element 5 according to section C-C of FIG. 2a. This embodiment differs from FIG. 6a in that any planar section is absent in the panel body 16. A central buckle 21 is provided for dividing and directing the flow of the liquid arriving from a downcomer of a tray located above the tray to which the extension element as shown in FIG. 7a belongs. In addition, an angle-shaped support element 27 is secured along each depending leg to receive a panel 12 of the mass transfer area thereon.

FIG. 7b only shows a small modification for the support of the panels 12 on the extension element 5. This solution has the advantage that the extension element 5 may be manufactured from a single piece without the need for a subsequent assembly of a support element 27 as for the embodiment of FIG. 7a.

Figure 8A:
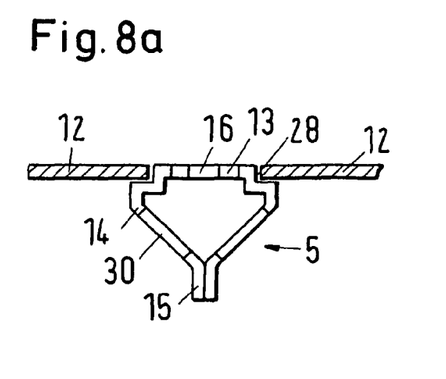
Figure 8B:
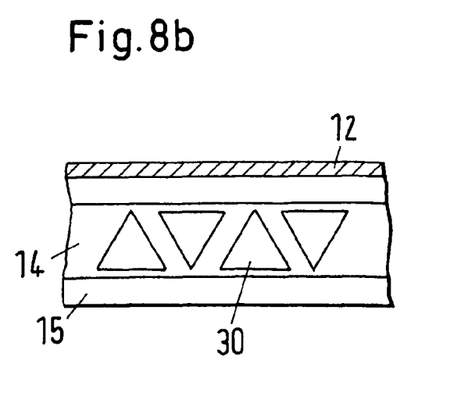

FIG. 8a and FIG. 8b show a sixth embodiment of an extension element 5 according to section C-C of FIG. 2a. The extension element 5 is in this case shaped as a closed profile, which provides even better stability with minimal material required for its manufacture. The extension element 5 may also contain perforations 13 in the panel body 16 thereby providing the same advantages as the embodiments according to FIG. 3a to 3c. The extension element 5 in this embodiment is constituted of the planar panel body 16 and lateral legs 14, which are inclined which respect to the vertical direction corresponding to the axis of the column. The legs 14 may terminate in feet 15 which are attached to each other to provide further stability to the extension element. In this variant, the panel body 16 has lateral indentations 28 for receiving perforated panels 12. This embodiment is advantageous as the liquid level above the perforated panels 12 and the panel body 16 of the extension element 5 is the same. Thus, the conditions for mass transfer above the perforated panels 12 and the panel body 16 are roughly the same or comparable. If the panel body 16 contains perforations 13, further openings 29 have to be foreseen for ensuring that gas arriving from a tray arranged below can arrive through the openings 29 at the perforations 13. Special perforations, slits or other type of openings may be foreseen in the feet 15 or the legs 14 allowing for the drainage of entrained liquid. Alternatively, the legs 14 may be joined directly thereby not requiring feet. Alternatively, the extension element 5 may be formed of a single hollow piece of sheet material.

Instead of a perforated panel 12, typical for a sieve tray, a valve tray, a fixed valve tray and the like may be used. Thus, the term "perforated panel 12" may be substituted by any of the devices as mentioned in the previous sentence. The mechanical connections between the perforated panels 12 and the extension element 5 may be executed using various methods not restricted to those shown FIGS. 3-8.

Figure 9A:
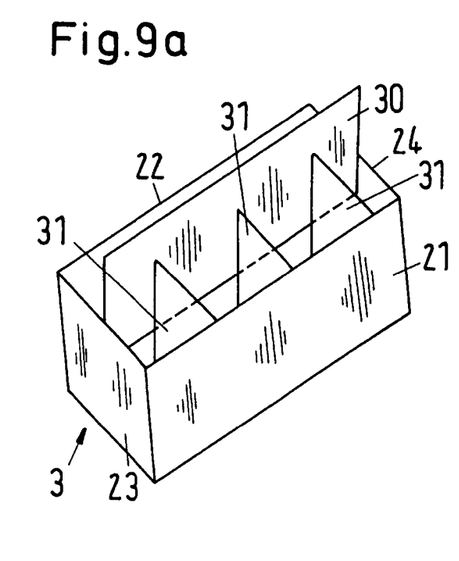
FIG. 9a shows a perspective view of a reinforcing means for increasing the stability of a downcomer.
Figure 9B:
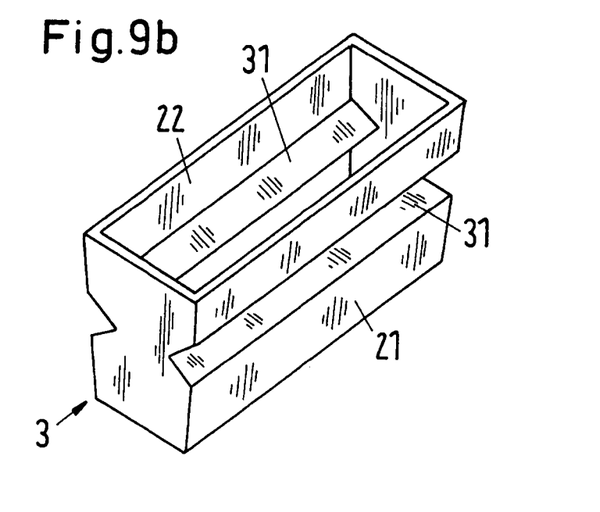
FIG. 9b shows a perspective view of a second variant of a reinforcing means for increasing the stability of a downcomer.
Figure 9C:
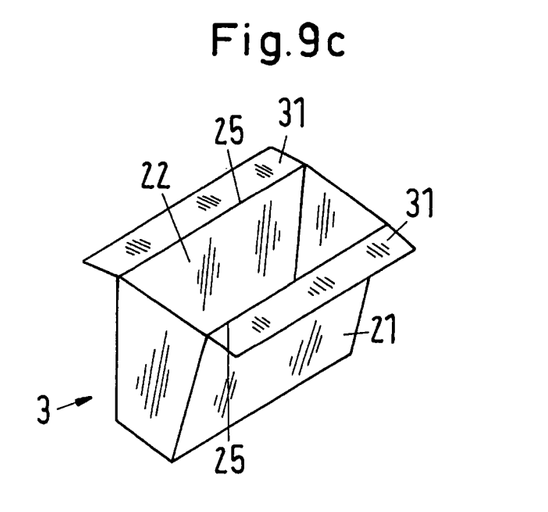
FIG. 9c shows a perspective view of a third variant of a reinforcing means for increasing the stability of a downcomer.

FIG. 9a, 9b, 9c, wherein like reference characters indicate like parts as above, show reinforcing means for increasing the stability of the downcomer 3 in particular against deflection and/or against buckling.

FIG. 9a shows a downcomer 3 comprising an anti-jump baffle 30. The anti-jump baffle 30 is connected to the downcomer at the end walls 23, 24. Additionally, reinforcing means 31 connect the anti-jump baffle 30 to the side walls 21, 22. In this embodiment, the reinforcing means assume the shape of panels, however, bars, profiles, tubes and other thin-walled structures are equally suitable.

FIG. 9b shows another variant of a reinforcing means 31 integral to each side wall 21, 22 of the downcomer 3. The reinforcing means 31 has the shape of a groove in each side wall.

FIG. 9c shows another type of reinforcing means 31 in the shape of a flap extending from the upper ridge 25 of at least one of the side walls 21, 22.

Any of the variants shown in FIG. 9a, 9b or 9c may be combined with each other.

What is claimed is:

1. A multiple downcomer tray for a mass transfer column comprising
   a mass transfer area;
   a plurality of downcomers within said mass transfer area for collecting and discharging a fluid from said area, each of said downcomers having a pair of lateral sidewalls and at least one end wall connecting said lateral side walls to define a channel for fluid flow; and
   a plurality of extension elements, each said extension element being secured to and extending longitudinally from an end wall of a respective one of said downcomers to form a unitary support structure, each said extension element comprising a panel body and at least one depending leg attached to said panel body.

2. A multiple downcomer tray according to claim 1 wherein a first downcomer of said plurality of downcomers is arranged in parallel orientation to a second downcomer of said plurality of downcomers.

3. A multiple downcomer tray according to claim 2 wherein at least 4 downcomers are arranged on the tray.

4. A multiple downcomer tray according to claim 2 wherein each said extension element is configured as a part of said mass transfer area.

5. A multiple downcomer tray according to claim 1 wherein said panel body of at least one of said extensions is elevated with respect to said mass transfer area.

6. A multiple downcomer tray according to claim 5 wherein said panel body of at least one of said extensions is recessed relative to said mass transfer area.

7. A multiple downcomer tray according to claim 5 wherein said leg of at least one of said extensions extends in a downward direction with respect to said mass transfer area and has a foot arranged at an angle with respect to said leg.

8. A multiple downcomer tray according to claim 5 wherein said panel body of at least one of said extensions comprises at least one buckle at an upper surface and at least one inclined surface extending from said buckle to said leg thereof.

9. A multiple downcomer tray according to claim 1 wherein the diameter of the tray is at least 3 meters.

10. A multiple downcomer tray according to claim 1 wherein said plurality of downcomers is arranged in a plurality of rows wherein in each row, the lateral side walls of adjacent downcomers face each other and the downcomers of neighbouring rows are arranged in a staggered manner.

11. A multiple downcomer tray according to claim 10 wherein said mass transfer area has a manway therein.

12. A multiple downcomer tray according to claim 11 wherein at least some of said plurality of downcomers have with movable baffles to allow passage of a human.

13. A multiple downcomer tray according to claim 1 wherein at least one of said downcomers and one of said extension elements of said plurality of downcomers and said plurality of extension elements is prestressed.

14. A multiple downcomer tray according to claim 1 wherein at least one of said downcomers and one of said extension elements of said plurality of downcomers and said plurality of extension elements include reinforcing means.

15. A multiple downcomer tray according to claim 1 wherein at least one of said plurality of downcomers is a truncated downcomer.

16. A support structure for a tray for a mass transfer column comprising
- a downcomer having a pair of lateral sidewalls and at least one end wall connecting said lateral side walls to define a channel for fluid flow; and
- an extension element secured to and extending longitudinally from said end wall of said downcomer to form a unitary support structure, said extension element comprising a panel body and at least one depending leg attached to said panel body.

17. A mass transfer column comprising
- a column having a cylindrical wall and at least one an annular ring fixed to an interior of said wall; and
- a multiple downcomer tray mounted on said annular ring within said column, said tray having a mass transfer area, a plurality of downcomers within said mass transfer area for collecting and discharging a fluid from said area, each of said downcomers resting on said annular ring at one end thereof and having a pair of lateral sidewalls and at least one end wall connecting said lateral side walls to define a channel for fluid flow; and a plurality of extension elements, each said extension element being secured to and extending longitudinally from an end wall of a respective one of said downcomers to form a unitary support structure and to rest on said annular ring, each said extension element comprising a panel body and at least one depending leg attached to said panel body.

* * * * *

UNITED STATES PATENT AND TRADEMARK OFFICE
CERTIFICATE OF CORRECTION

| | | |
|---|---|---|
| PATENT NO. | : 8,136,799 B2 | |
| APPLICATION NO. | : 12/384118 | |
| DATED | : March 20, 2012 | |
| INVENTOR(S) | : Bartele Griepsma | |

It is certified that error appears in the above-identified patent and that said Letters Patent is hereby corrected as shown below:

Column 6
Line 54, change "if" to -- 1f --

Signed and Sealed this
Eighth Day of May, 2012

David J. Kappos
*Director of the United States Patent and Trademark Office*